(12) United States Patent
Kim

(10) Patent No.: US 11,971,261 B2
(45) Date of Patent: Apr. 30, 2024

(54) APPARATUS AND METHOD FOR GENERATING ROUTE

(71) Applicants: Hyundai Motor Company, Seoul (KR); Kia Corporation, Seoul (KR)

(72) Inventor: Joon Hyung Kim, Seoul (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 422 days.

(21) Appl. No.: 17/319,552

(22) Filed: May 13, 2021

(65) Prior Publication Data
US 2022/0128368 A1    Apr. 28, 2022

(30) Foreign Application Priority Data
Oct. 28, 2020  (KR) .......... 10-2020-0141554

(51) Int. Cl.
*G01C 21/34* (2006.01)
*G06Q 10/02* (2012.01)
*G06Q 50/40* (2024.01)
*G06V 20/59* (2022.01)
*G06V 40/16* (2022.01)

(52) U.S. Cl.
CPC ..... *G01C 21/3423* (2013.01); *G01C 21/3461* (2013.01); *G06Q 10/02* (2013.01); *G06Q 50/40* (2024.01); *G06V 20/593* (2022.01); *G06V 40/161* (2022.01); *G06V 40/178* (2022.01)

(58) Field of Classification Search
CPC ........... G01C 21/3423; G01C 21/3461; G06Q 10/02; G06Q 50/30; G06V 20/593; G06V 40/178
See application file for complete search history.

(56) References Cited

U.S. PATENT DOCUMENTS

| 10,890,456 B2 | 1/2021 | Lee et al. | |
| 2008/0250095 A1* | 10/2008 | Mizuno | G06F 16/95 348/E7.071 |
| 2012/0271547 A1* | 10/2012 | Mori | G08G 1/20 701/527 |
| 2016/0334236 A1* | 11/2016 | Mason | G01C 21/3461 |
| 2020/0049518 A1* | 2/2020 | Lee | G01C 21/3423 |
| 2021/0356288 A1* | 11/2021 | Hajj | G01C 21/3629 |

FOREIGN PATENT DOCUMENTS

KR    20200016541 A    2/2020

* cited by examiner

*Primary Examiner* — Peter D Nolan
*Assistant Examiner* — Anwar Mohamed
(74) *Attorney, Agent, or Firm* — SLATER MATSIL, LLP

(57) ABSTRACT

An embodiment apparatus for generating a route includes a sensor configured to detect an occupant, luggage loaded in a vehicle, and a transportation device, and a controller configured to determine whether the transportation device is available based on the occupant and the luggage, determine a difficulty of boarding public transportation based on the occupant and the luggage, set a route search target, and generate at least one moving route based on the route search target.

20 Claims, 6 Drawing Sheets

| OCCUPANT | | | LUGGAGE | NUMBER OF BOARDABLE MOVING DEVICES | | WEATHER | WHETHER ROUTE IS INCLUDED | |
|---|---|---|---|---|---|---|---|---|
| ADULT | INFANT | ELDERLY PERSON | | ADULT | INFANT | | BICYCLE | PUBLIC TRANSPORTATION |
| 1 | | | NONE/LESS | | | PLEASANT | | ○ |
| 2 | | | NONE/LESS | 2 | | PLEASANT | ○ | ○ |
| 1 | | | NONE/LESS | 1 | | SNOW/RAIN/EXTREME HOT/EXTREME COLD | × | △ |
| 1 | | | MANY/LARGE | 1 | | PLEASANT | × | △ |
| 2 | 2 | | NONE/LESS | 2 | 2 | PLEASANT | △ | △ |
| 2 | 2 | | MANY/LARGE | 2 | 2 | PLEASANT | × | △ |
| 1 | | 2 | NONE/LESS | 3 | | PLEASANT | △ | △ |
| 1 | | 2 | MANY/LARGE | 1 | | SNOW/RAIN/EXTREME HOT/EXTREME COLD | × | △ |

○: INCLUDING
△: USER CONFIRMATION
×: EXCLUDING

FIG.3

APPARATUS AND METHOD FOR GENERATING ROUTE

CROSS-REFERENCE TO RELATED APPLICATIONS

This application claims the benefit of Korean Patent Application No. 10-2020-0141554, filed in the Korean Intellectual Property Office on Oct. 28, 2020, which application is hereby incorporated herein by reference.

TECHNICAL FIELD

The present disclosure relates to an apparatus and a method for generating a route.

BACKGROUND

Recently, a route search service for searching for a route to which a user desires to move as well as map information is provided through an app stored in a terminal. In particular, the route search service may provide a route to which a user desires to move by linking a vehicle and a separate transportation device, or linking a vehicle and public transportation.

However, such a route search service may provide a route search result based on information input from a user, and thus may cause inconvenience of inputting information to the user. In addition, because the route search service provides a route search result without taking into account the presence or absence of luggage in the vehicle, the volume of luggage, and the like, when a route linked with public transportation is provided in a state where luggage exists, there is a limit that increases the inconvenience to the user.

SUMMARY

Embodiments of the present disclosure can solve problems occurring in the prior art while advantages achieved by the prior art are maintained intact.

An embodiment of the present disclosure provides an apparatus and a method for generating a route that can minimize the inconvenience of an occupant when a vehicle and a separate transportation device are linked or a route linking the vehicle and public transportation is provided.

The technical problems to be solved by embodiments of the present inventive concept are not limited to the aforementioned problems, and any other technical problems not mentioned herein will be clearly understood from the following description by those skilled in the art to which the present disclosure pertains.

According to an embodiment of the present disclosure, an apparatus for generating a route includes a sensor that detects an occupant, luggage loaded in a vehicle, and a transportation device, and a controller that determines whether the transportation device is available based on the occupant and the luggage, determines a difficulty of boarding public transportation based on the occupant and the luggage, sets a route search target, and generates at least one moving route based on the route search target.

The controller may obtain an occupant state based on the occupant detected by using the sensor, and determine whether the luggage is loaded in the transportation device when it is determined that the occupant is able to use the transportation device based on the occupant state.

The controller may include a bicycle-only road in the route search target when it is determined that the luggage is loaded in the transportation device.

The controller may exclude a bicycle-only road from the route search target when it is determined that the occupant is unable to use the transportation device or that the luggage is not loaded in the transportation device.

The controller may output a guide message for confirming to the occupant whether to include a bicycle-only road in the route search target when an infant under a first age or an elderly person exceeding a second age is included among occupants.

The controller may output a guide message for confirming to the occupant whether to include a public transportation moving route in the route search target when the difficulty of boarding public transportation is equal to or greater than a preset reference difficulty.

The controller may include the public transportation moving route in the route search target when the difficulty of boarding public transportation is less than the preset reference difficulty.

The controller may control the at least one moving route to be output through an output device.

The controller may control to output a pop-up message informing that a public transportation moving route or the bicycle-only road is included in the moving route when the at least one moving route is selected by the occupant and the public transportation moving route or the bicycle-only road is included in the moving route selected by the occupant among the at least one moving route.

The controller may control the pop-up message to include information about the occupant, information about the luggage, information about the transportation device, and information about the difficulty of boarding public transportation obtained by the sensor and to be output.

According to another embodiment of the present disclosure, a method of generating a route includes detecting an occupant, luggage loaded in a vehicle, and a transportation device by using a sensor, determining whether the transportation device is available based on the occupant and the luggage, and determining a difficulty of boarding public transportation based on the occupant and the luggage to set a route search target, and generating at least one moving route based on the route search target.

The method may further include obtaining an occupant state based on the occupant detected by using the sensor, and determining whether the luggage is loaded in the transportation device when it is determined that the occupant is able to use the transportation device based on the occupant state.

The method may further include a bicycle-only road in the route search target when it is determined that the luggage is loaded in the transportation device.

The method may further exclude a bicycle-only road from the route search target when it is determined that the occupant is unable to use the transportation device or that the luggage is not loaded in the transportation device.

The method may further include outputting a guide message for confirming to the occupant whether to include a bicycle-only road in the route search target when an infant under a first age or an elderly person exceeding a second age is included among occupants.

The method may further include outputting a guide message for confirming to the occupant whether to include a public transportation moving route in the route search target when the difficulty of boarding public transportation is equal to or greater than a preset reference difficulty.

The method may further include the public transportation moving route in the route search target when the difficulty of boarding public transportation is less than the preset reference difficulty.

The method may further include outputting the at least one moving route through an output device.

The method may further include outputting a pop-up message informing that a public transportation moving route or the bicycle-only road is included in the moving route when the at least one moving route is selected by the occupant and the public transportation moving route or the bicycle-only road is included in the moving route selected by the occupant among the at least one moving route.

The method may output the pop-up message including information about the occupant, information about the luggage, information about the transportation device, and information about the difficulty of boarding public transportation obtained by the sensor.

BRIEF DESCRIPTION OF THE DRAWINGS

The above and other objects, features and advantages of embodiments of the present disclosure will be more apparent from the following detailed description taken in conjunction with the accompanying drawings, in which:

FIG. 3 is a diagram schematically illustrating a scheme of determining a route search target corresponding to a difficulty of boarding public transportation according to an embodiment of the present disclosure;

DETAILED DESCRIPTION OF ILLUSTRATIVE EMBODIMENTS

Figure 1:
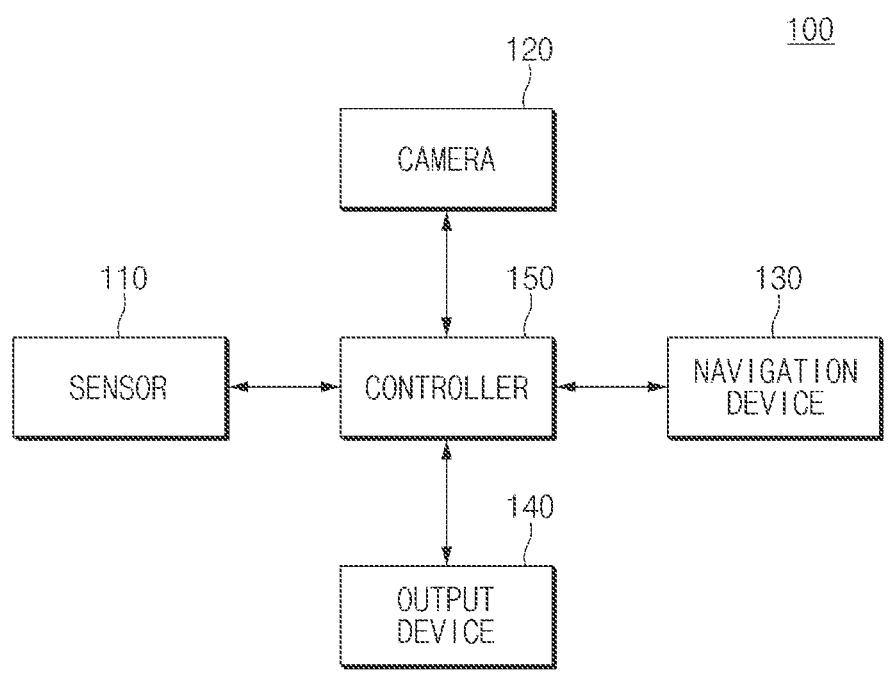
FIG. 1 is a block diagram illustrating the configuration of an apparatus for generating a route according to an embodiment of the present disclosure.

Hereinafter, some embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the embodiments of the present disclosure, a detailed description of well-known features or functions will be omitted in order not to unnecessarily obscure the gist of the present disclosure.

In describing the components of the embodiments according to the present disclosure, terms such as first, second, "A", "B", (a), (b), and the like may be used. These terms are merely intended to distinguish one component from another component, and the terms do not limit the nature, sequence or order of the constituent components. Unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

FIG. 1 is a block diagram illustrating the configuration of an apparatus for generating a route according to an embodiment of the present disclosure.

As shown in FIG. 1, an apparatus 100 for generating a route may include a sensor 110, a camera 120, a navigation device 130, an output device 140, and a controller 150.

The sensor 110 may detect an occupant, luggage load in a vehicle, and a transportation device. To this end, the sensor 110 may include a seat sensor 111, an ISOFIX sensor 112, a trunk sensor 113, and a cradle sensor 114. A more detailed operation of the sensor 110 will be described with reference to FIG. 2.

Figure 2:
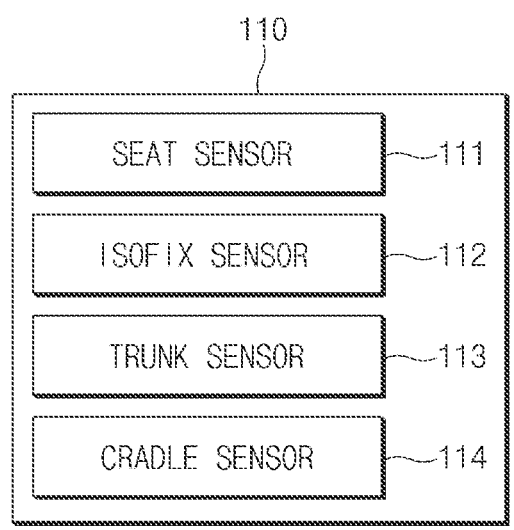
FIG. 2 is a diagram illustrating the configuration of a sensor according to an embodiment of the present disclosure.

FIG. 2 is a diagram illustrating the configuration of a sensor according to an embodiment of the present disclosure.

As shown in FIG. 2, the sensor 110 according to an embodiment of the present disclosure may include the seat sensor 111, the ISOFIX sensor 112, the trunk sensor 113, and the cradle sensor 114.

The seat sensor 111 may include a sensor provided on a seat on which an occupant can sit, and may obtain information about whether the occupant sits on the seat and the weight of the occupant.

The ISOFIX sensor 112 may detect whether an infant seat is completely attached to the seat of a vehicle, and detect whether an occupant sits on the infant seat. When a weight sensor is included in the ISOFIX sensor 112, the weight information of the occupant seated in the infant seat may be obtained. When any weight sensors are not included in the ISOFIX sensor 112, the controller 150 may obtain the weight information of the occupant sitting in the infant seat by excluding the weight of the infant seat using the weight information obtained by the seat sensor 111.

The trunk sensor 113 may include a weight measurement sensor to obtain the weight of luggage loaded in a trunk, and may include an infrared sensor to measure the volume of luggage loaded in the trunk.

The cradle sensor 114 may include a sensor provided in a cradle mounted outside the vehicle, and a moving device such as a bicycle, a kickboard, or the like that may be mounted on the vehicle may be mounted on the cradle.

The camera 120 may obtain a vehicle inside image. According to an embodiment of the present disclosure, an occupant image or luggage image may be obtained through the vehicle inside image. The camera 120 may include an in-cabin camera, and may acquire a face image of an occupant. In addition, the camera 120 may obtain a vehicle outside image. According to an embodiment of the present disclosure, the vehicle outside image may include an image of a cradle mounted outside the vehicle.

The navigation device 130 may provide map information of a specified area based on a current location of the vehicle. In addition, a GPS receiver may be provided to receive the current location of the vehicle and a basic moving route to the destination may be provided based on the current location of the vehicle. According to an embodiment of the present disclosure, the navigation device 130 may provide at least one moving route generated by the controller 150 as well as the basic moving route. The navigation device 130 may be provided with a separate output device to provide various types of information. The output device of the navigation device 130 may be provided integrally with the output device 140 according to an embodiment of the present disclosure. The output device of the navigation device 130 may include a display device and a sound output device.

The output device 140 may be provided integrally with the output device of the navigation device 130, and may provide at least one moving route generated by the controller 150. The output device 140 may include a display device of the navigation device 130, a HUD, a cluster, and the like.

The controller 150 may be implemented with various processing devices such as a microprocessor including a semiconductor chip capable of performing operation or execution of various commands, and may control an operation of an apparatus for generating a route according to an embodiment of the present disclosure. In detail, the controller 150 may determine whether a transportation device is usable based on an occupant and luggage, determine a difficulty of boarding public transportation based on the occupant and the luggage to set a route search target, and generate at least one moving route based on the route search target.

The controller 150 may obtain an occupant state, loaded luggage information, and transportation device information based on the occupant, the loaded luggage, and the transportation device detected by the sensor. According to an embodiment, when an occupant sits on a seat, based on the occupant's weight obtained through the seat sensor, the controller 150 may determine that the occupant is an adult when the weight exceeds a reference value. In addition, the controller 150 may determine whether an infant is on board based on information obtained through the ISOFIX sensor. When the infant seat is fixed to a vehicle seat and an occupant sits on the infant seat, the controller 150 may determine that an infant under a first age is on board. In addition, the controller 150 may estimate the age of the occupant based on the information obtained through the camera 120, and determine the occupant as an elderly person when the age of the occupant exceeds a second age.

The controller 150 may determine whether luggage is loaded in the vehicle based on the information obtained through the trunk sensor 113 and the camera 120, and determine whether the transportation device is mounted on the cradle based on the information obtained through the cradle sensor 114 and the camera 120. According to an embodiment, the controller 150 may determine an adult transportation device and an infant transportation device based on the size of the transportation device mounted on the cradle.

The controller 150 may determine whether all occupants in the vehicle can use the transportation device based on the occupant state. When the number of occupants in the vehicle is less than or equal to the number of transportation devices, the controller 150 may determine that the transportation device can be used. However, even though it is determined that the transportation device mounted on the vehicle can be used, when it is determined that an infant or an elderly person is included among the occupants, the controller 150 may output a guide message for confirming to the occupant whether to use the transportation device.

When it is determined that all occupants can use the transportation device, the controller 150 may determine whether all luggage loaded in the vehicle can be loaded in the transportation device mounted on the vehicle.

When it is determined that all occupants in the vehicle cannot use the transportation device, or that all luggage loaded in the vehicle is not loaded in the transportation device mounted on the vehicle, the controller 150 may exclude a bicycle-only road from the route search target. Meanwhile, when it is determined that all occupants in the vehicle can use the transportation device, or that all luggage loaded in the vehicle can be loaded in the transportation device mounted on the vehicle, the controller 150 may include the bicycle-only road in the route search target.

The controller 150 may determine the difficulty of boarding public transportation of an occupant.

According to an embodiment, the controller 150 may determine the difficulty of boarding public transportation based on the occupant and luggage. For example, the controller 150 may increase the difficulty of boarding public transportation as the number of occupants increases. In addition, the controller 150 may increase the difficulty of boarding public transportation when an elderly person is included as the occupant. In addition, the controller 150 may increase the difficulty as the weight of the luggage increases.

According to another embodiment, the controller 150 may determine the difficulty of boarding public transportation corresponding to the ease of boarding the public transportation. For example, the controller 150 may increase the difficulty of boarding public transportation in the order of train, subway, bus, and bicycle. That is, in the case of a train, the controller 150 may set the difficulty of boarding public transportation to the lowest, and in the case of a bicycle, the difficulty of boarding public transportation may be set to the highest.

According to still another embodiment, the controller 150 may determine the difficulty of boarding public transportation based on weather or time. For example, in the case of snow or rainy weather, the controller 150 may increase the difficulty of boarding public transportation. In the case of high-temperature weather exceeding a preset first temperature, or low-temperature weather less than a preset second temperature, the controller 150 may increase the difficulty of boarding public transportation. In addition, during rush hour, the controller 150 may increase the difficulty of boarding public transportation.

In addition, the controller 150 may determine a route search target according to the difficulty of boarding public transportation. See FIG. 3 for a more detailed description.

FIG. 3 is a diagram schematically illustrating a scheme of determining a route search target corresponding to a difficulty of boarding public transportation according to an embodiment of the present disclosure.

As shown in FIG. 3, according to an embodiment, when it is determined that only one adult is in the vehicle, there is no or little luggage, and the weather is pleasant, the controller 150 may reduce the difficulty of boarding public transportation and may allow a public transportation moving route to be included in the route search target, so that the use of public transportation is linked.

In addition, when it is determined that only one adult is in the vehicle, the number of vehicles that can be boarded is one, the weather is pleasant, and there are many bags (luggage) loaded in the vehicle so that all luggage is not loaded in the vehicle, the controller 150 may determine that it is impossible to use the transportation device and may exclude the bicycle-only road from the target of the route search. In addition, the controller 150 may increase the difficulty of boarding public transportation and may output a guide message for confirming to the occupant whether to use public transportation.

In addition, when it is determined that two adults and two infants are in the vehicle, there is no or less luggage, there are two transportation devices for adults and two for infants that can be boarded, and the weather is pleasant, because an infant is included as an occupant, the controller 150 may output a guide message for confirming whether to use the transportation device. In addition, the controller 150 may increase the difficulty of boarding public transportation, and when the difficulty of boarding public transportation is equal to or greater than a preset difficulty, the controller 150 may output a guide message for confirming whether to use public transportation.

In addition, when one adult and two elderly persons are in the vehicle, there is a lot of luggage, there is one transportation device for adults that can be boarded, and the weather is rain or snow, the controller 150 may determine that there is no transportation device to use, and exclude the bicycle-only road from the route search target. In addition, the controller 150 may increase the difficulty of boarding public transportation, and when the difficulty of boarding public transportation is greater than or equal to a preset difficulty level, the controller 150 may output a guide message for confirming to the occupant whether to use public transportation.

After guiding whether to use public transportation to the occupant, the controller 150 may include a public transportation moving route in the route search target when the occupant selects to use public transportation. Meanwhile, when the occupant selects not to use public transportation, the public transportation moving route may be excluded from the route search target.

As described above, the controller 150 may determine the route search target and generate at least one moving route based on the determined route search target. In addition, the controller 150 may control to output at least one moving route through the output device. The detail will be described with reference to FIGS. 4A and 4B.

Figure 4A:
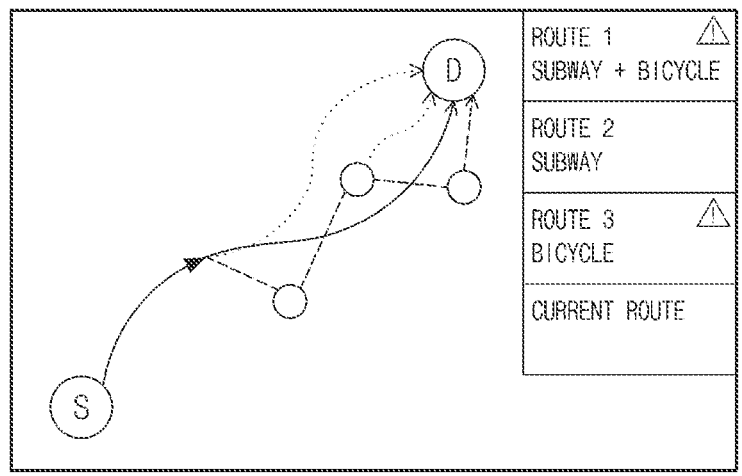
FIGS. 4A and 4B are diagrams illustrating routes generated according to an embodiment of the present disclosure.
Figure 4B:
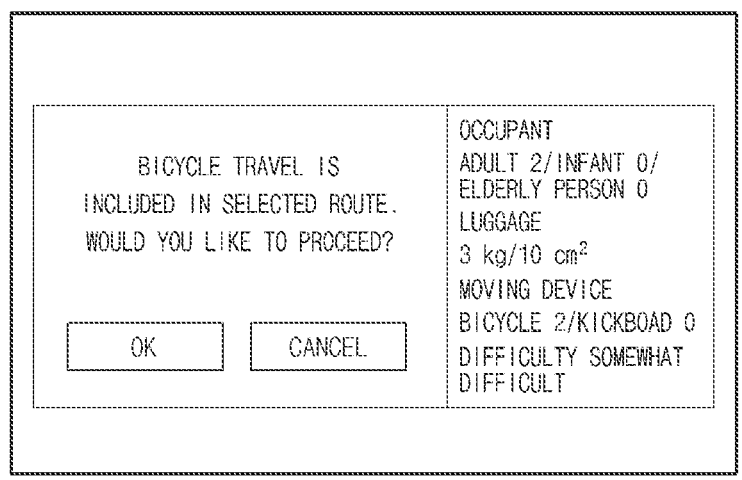

FIGS. 4A and 4B are diagrams illustrating routes generated according to an embodiment of the present disclosure.

As shown in FIG. 4A, the controller 150 may generate at least one moving route based on a route search target from a departure point "S" to a destination "D". The controller 150 may output an initially set route (current route) and the moving route (route 1, route 2 and route 3) generated based on the route search target determined in the above-described scheme. The controller 150 may output routes having a movement time shorter than the movement time of the initially set route as moving routes. In addition, the controller 150 may output route 1, route 2, and route 3 in different colors corresponding to the difficulty of boarding public transportation, and when the difficulty of boarding public transportation is equal to or greater than a preset difficulty, a warning icon may be output.

As shown in FIG. 4B, when at least one movement route is selected by an occupant, and a public transportation moving route or a bicycle-only road is included in the selected moving route, the controller 150 may output a pop-up message indicating that a public transportation moving route or a bicycle-only road is included in the moving route. In addition, the controller 150 may output, through the pop-up message, information about the difficulty of boarding public transportation together with information about an occupant's state, information about the luggage, and information about the transportation device. In addition, the controller 150 may display the pop-up message to enable the occupant to modify the occupant state, the luggage information, and the transportation device information output through the pop-up message.

Figure 5:
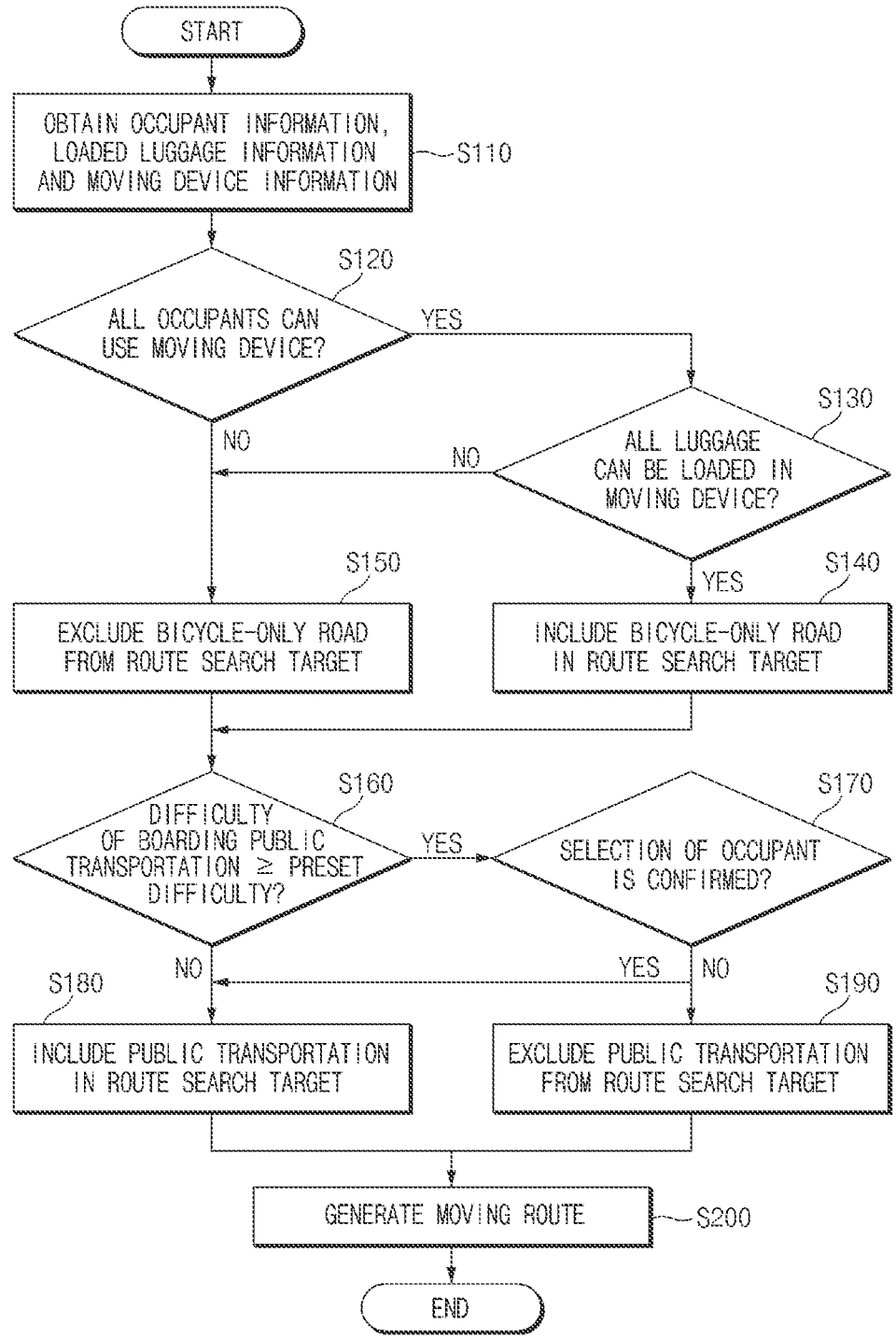
FIG. 5 is a flowchart illustrating a method of generating a route according to an embodiment of the present disclosure.

FIG. 5 is a flowchart illustrating a method of generating a route according to an embodiment of the present disclosure.

As shown in FIG. 5, in S110, the controller 150 may obtain the occupant state information, luggage information, and transportation device information based on the occupant, luggage, and transportation device detected by the sensor 110.

In S120, the controller 150 determines whether all occupants can use the transportation device based on the occupant state. In S120, when the number of occupants is less than or equal to the number of transportation devices, the controller 150 may determine that it is possible to use the transportation device. When it is determined in S120 that all occupants can use the transportation devices (YES), in S130, the controller 150 may determine whether all of the luggage loaded in the vehicle can be loaded in the transportation devices. When it is determined in S130 that all of the luggage loaded in the vehicle can be loaded in the transportation devices (YES), in S140, the controller 150 may include the bicycle-only road in the route search target.

Meanwhile, when it is determined in S120 that all occupants in the vehicle cannot use the transportation device (NO), or it is determined in S130 that all of the luggage loaded in the vehicle cannot be loaded in the transportation device (NO), in S150, the controller 150 may exclude the bicycle-only road from the route search target.

In S160, the controller 150 may determine the difficulty of boarding public transportation of an occupant. According to an embodiment, in S160, the controller 150 may determine the difficulty of boarding public transportation based on the occupant and luggage, or may determine the difficulty of boarding public transportation corresponding to the ease of boarding public transportation. In addition, the controller 150 may determine the difficulty of boarding public transportation based on weather or time.

When the difficulty of boarding public transportation is equal to or greater than the preset difficulty in S160 (YES), in S170, the controller 150 may output a guide message for confirming to the occupant whether to use public transportation and may confirm the selection of the occupant. When it is confirmed in S170 that the occupant uses public transportation (YES), the controller 150 may include a public transportation road in the route search target in S180. Meanwhile, when it is determined in S170 that the occupant does not use public transportation (NO), the controller 150 may exclude the public transportation road from the route search target in S190.

In S200, the controller 150 may generate at least one moving route based on the route search target determined through S150 to S190.

Figure 6:
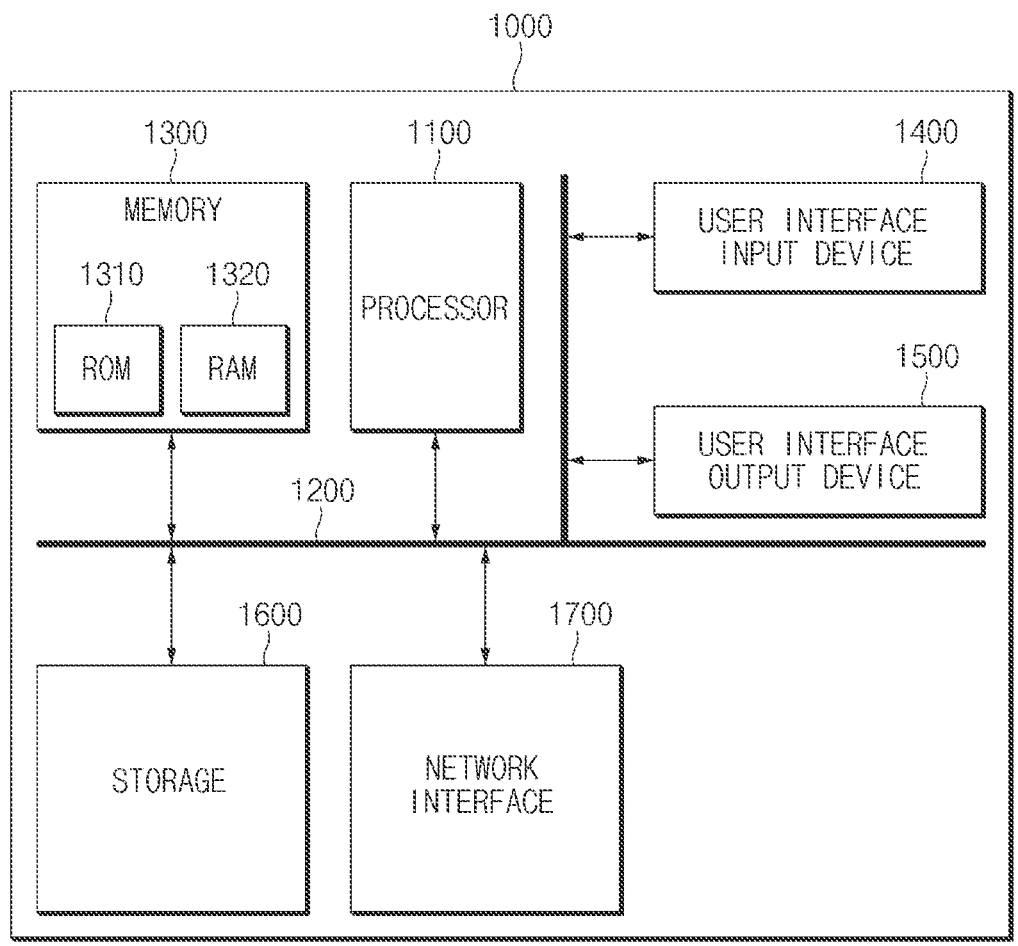
FIG. 6 is a view illustrating a computing system for executing a method according to an embodiment of the present disclosure.

FIG. 6 is a view illustrating a computing system for executing a method according to an embodiment of the present disclosure.

Referring to FIG. 6, a computing system 1000 may include at least one processor 1100, a memory 1300, a user interface input device 1400, a user interface output device 1500, storage 1600, and a network interface 1700 connected through a bus 1200.

The processor 1100 may be a central processing unit (CPU), or a semiconductor device that processes instructions stored in the memory 1300 and/or the storage 1600. The memory 1300 and the storage 1600 may include various types of volatile or non-volatile storage media. For example, the memory 1300 may include a read only memory (ROM) 1310 and a random access memory (RAM) 1320.

Accordingly, the processes of the method or algorithm described in relation to the embodiments of the present disclosure may be implemented directly by hardware executed by the processor 1100, a software module, or a combination thereof. The software module may reside in a storage medium (that is, the memory 1300 and/or the storage 1600), such as a RAM, a flash memory, a ROM, an EPROM, an EEPROM, a register, a hard disk, a solid state drive (SSD), a detachable disk, or a CD-ROM. The exemplary storage medium is coupled to the processor 1100, and the processor 1100 may read information from the storage medium and may write information in the storage medium. In another method, the storage medium may be integrated with the processor 1100. The processor and the storage medium may reside in an application specific integrated circuit (ASIC). The ASIC may reside in a user terminal. In another method, the processor and the storage medium may reside in the user terminal as an individual component.

The apparatus and method for generating a route according to an embodiment of the present disclosure may automatically determine the state of an occupant and the state of luggage to provide a route suitable for the occupant when linking a vehicle and a separate transportation device, or providing a route linking a vehicle and public transportation, so that it is possible to minimize the discomfort of the occupant.

The above description is a simple exemplification of the technical spirit of the present disclosure, and the present disclosure may be variously corrected and modified by those skilled in the art to which the present disclosure pertains without departing from the essential features of the present disclosure.

Therefore, the disclosed embodiments of the present disclosure do not limit the technical spirit of the present disclosure but are illustrative, and the scope of the technical spirit of the present disclosure is not limited by the embodiments of the present disclosure. The scope of the present disclosure should be construed by the claims, and it will be understood that all the technical spirits within the equivalent range fall within the scope of the present disclosure.

What is claimed is:

1. An apparatus for generating a route, the apparatus comprising:
   a sensor configured to detect an occupant and luggage loaded in a vehicle, and a transportation device; and
   a controller configured to:
      determine whether the transportation device is available based on the occupant and the luggage,
      determine a difficulty of boarding public transportation based on the occupant and the luggage,
      set a route search target,
      generate at least one moving route based on the route search target, and
      control the at least one moving route to be output through an output device,
      wherein the transportation device is mounted on a cradle mounted outside the vehicle.

2. The apparatus of claim 1, wherein the controller is further configured to:
   obtain an occupant state based on the occupant detected by the sensor, and
   determine whether the luggage is loaded in the transportation device when it is determined that the occupant is able to use the transportation device based on the occupant state.

3. The apparatus of claim 2, wherein the controller is further configured to include a bicycle-only road in the route search target when it is determined that the luggage is loaded in the transportation device.

4. The apparatus of claim 2, wherein the controller is further configured to exclude a bicycle-only road from the route search target when it is determined that the occupant is unable to use the transportation device or that the luggage is not loaded in the transportation device.

5. The apparatus of claim 2, wherein the controller is further configured to output a guide message to the occupant for confirming whether to include a bicycle-only road in the route search target when an infant under a first age or an elderly person exceeding a second age is included among occupants.

6. The apparatus of claim 1, wherein the controller is further configured to output a guide message to the occupant for confirming whether to include a public transportation moving route in the route search target when the difficulty of boarding public transportation is equal to or greater than a preset reference difficulty.

7. The apparatus of claim 6, wherein the controller is further configured to include the public transportation moving route in the route search target when the difficulty of boarding public transportation is less than the preset reference difficulty.

8. The apparatus of claim 1, wherein the controller is further configured to output a pop-up message informing that a public transportation moving route or a bicycle-only road is included in a moving route when the at least one moving route is selected by the occupant and the public transportation moving route or the bicycle-only road is included in the moving route selected by the occupant among the at least one moving route.

9. The apparatus of claim 8, wherein the controller is further configured to control the pop-up message to include information about the occupant, information about the luggage, information about the transportation device, and information about the difficulty of boarding public transportation and to output the pop-up message.

10. A method of generating a route, the method comprising:
    detecting, by a sensor, an occupant and luggage loaded in a vehicle, and a transportation device;
    determining, by a controller, whether the transportation device is available based on the occupant and the luggage;
    determining, by the controller, a difficulty of boarding public transportation based on the occupant and the luggage to set a route search target; and
    generating, by the controller, at least one moving route based on the route search target,
    wherein the controller is configured to control the at least one moving route to be output through an output device,
    wherein the transportation device is mounted on a cradle mounted outside the vehicle.

11. The method of claim 10, further comprising:
    obtaining an occupant state based on the occupant detected by using the sensor; and
    determining whether the luggage is loaded in the transportation device when it is determined that the occupant is able to use the transportation device based on the occupant state.

12. The method of claim 11, further comprising including a bicycle-only road in the route search target when it is determined that the luggage is loaded in the transportation device.

13. The method of claim 11, further comprising excluding a bicycle-only road from the route search target when it is determined that the occupant is unable to use the transportation device or that the luggage is not loaded in the transportation device.

14. The method of claim 11, further comprising outputting a guide message to the occupant for confirming whether to include a bicycle-only road in the route search target when an infant under a first age or an elderly person exceeding a second age is included among occupants.

15. The method of claim 10, further comprising outputting a guide message to the occupant for confirming whether to include a public transportation moving route in the route search target when the difficulty of boarding public transportation is equal to or greater than a preset reference difficulty.

16. The method of claim 15, further comprising including the public transportation moving route in the route search target when the difficulty of boarding public transportation is less than the preset reference difficulty.

17. The method of claim 10, further comprising outputting a pop-up message informing that a public transportation moving route or a bicycle-only road is included in the moving route when the at least one moving route is selected by the occupant and the public transportation moving route or the bicycle-only road is included in the moving route selected by the occupant among the at least one moving route.

18. The method of claim 17, further comprising outputting the pop-up message including information about the occupant, information about the luggage, information about the transportation device, and information about the difficulty of boarding public transportation.

19. An apparatus for generating a route, the apparatus comprising:
 a sensor configured to detect an occupant and luggage loaded in a vehicle, and a transportation device; and
 a controller configured to:
  determine whether the transportation device is available based on the occupant and the luggage,
  determine a difficulty of boarding public transportation based on the occupant and the luggage,
  set a route search target,
  generate at least one moving route based on the route search target, and
  output a guide message to the occupant for confirming whether to include a public transportation moving route in the route search target when the difficulty of boarding public transportation is equal to or greater than a preset reference difficulty.

20. The apparatus of claim 19, wherein the transportation device is mounted on a cradle mounted outside the vehicle.

* * * * *